United States Patent [19]

Roux

[11] Patent Number: 4,648,893
[45] Date of Patent: Mar. 10, 1987

[54] PROCESS AND APPARATUS FOR LUBRICATING GLASS MOLD CASTINGS

[75] Inventor: Michel Roux, Marnes-La-Coquette, France

[73] Assignee: L'Air Liquide, Paris, France

[21] Appl. No.: 773,325

[22] Filed: Sep. 6, 1985

[30] Foreign Application Priority Data

Sep. 18, 1984 [FR] France ............... 84 14266

[51] Int. Cl.⁴ .................................... C03B 39/00
[52] U.S. Cl. ................................. 65/26; 65/24; 65/169; 65/170
[58] Field of Search ............... 65/24, 26, 169, 170

[56] References Cited

U.S. PATENT DOCUMENTS 3,580,711 5/1971 Hamilton ............................. 65/169
4,165,974 8/1979 Goodwin ............................. 65/26
4,333,756 6/1982 Seeman ............................. 65/25.1

FOREIGN PATENT DOCUMENTS 0043261 6/1982 European Pat. Off.
86541 3/1985 Fed. Rep. of Germany .......... 65/26
1285586 3/1961 France .
2128312 2/1972 France .
2460312 7/1979 France ............................. 65/26

Primary Examiner—Arthur Kellogg
Attorney, Agent, or Firm—Lee C. Robinson, Jr.

[57] ABSTRACT

Two fixed heads are used to lubricate a split-mold. The heads do not interfere with the movements of the mold and are effective to inject a jet of a gas that forms a powdery carbonaceous material. When the mold is open, the injection axis of each head is just about in line with the axis of the associated half-casting.

13 Claims, 6 Drawing Figures

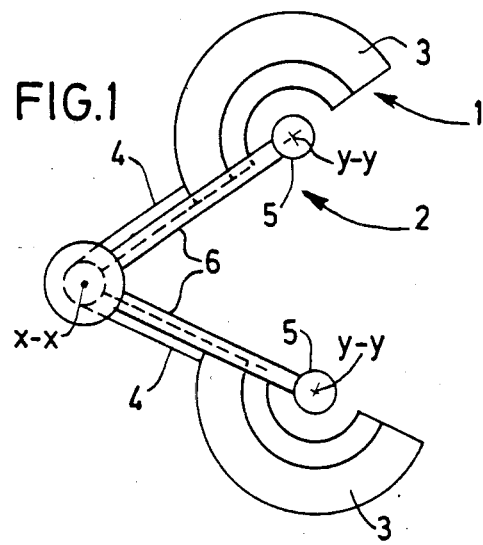
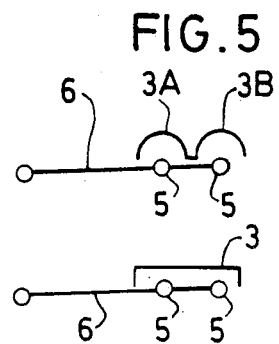
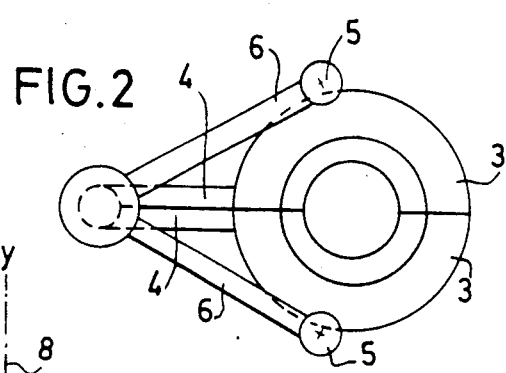
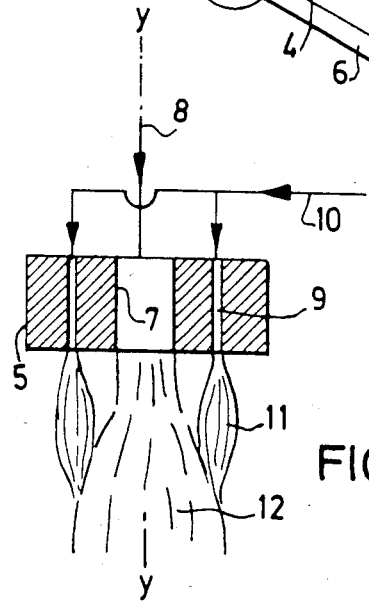
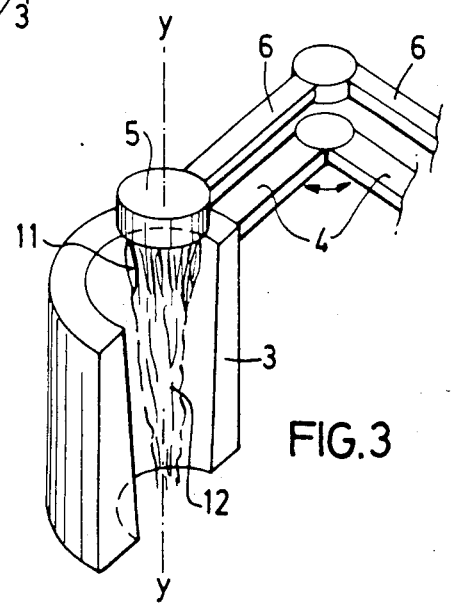

PROCESS AND APPARATUS FOR LUBRICATING GLASS MOLD CASTINGS

BACKGROUND OF THE INVENTION

This invention relates to a process and apparatus for lubricating a split-mold mold casting and more particularly to such a process and apparatus in which the casting is lubricated by means of a jet of gas that is heat-treated to form a powdery carbonaceous material.

In a known usage of such a jet (see, e.g., French Pat. No. 2,460,312), the jet is sent directly to the surface to be lubricated, i.e., in a direction almost perpendicular to the surface. This has limited industrial development of the system because, in certain cases, especially in the lubrication of split-molds in high-speed production lines, for example, to lubricate rough-forming molds in glass bottle making machines, the implementation of the system heretofore required the use of a mobile injection head that considerably complicated the machine.

SUMMARY

One general object of the invention, therefore, is to avoid this difficulty and to provide a new and improved process and apparatus for lubricating a split-mold molded casting.

Another object of this invention is to provide a process and apparatus for the automatic lubrication of such a casting in which the lubricating feature may be readily incorporated into a high-speed, complex manufacturing cycle such as the manufacturing cycle of glass bottles on a so-called "I.S. machine".

Still another object of the invention is to provide such a process and apparatus which is economical and thoroughly reliable in operation. In one illustrative embodiment of the invention, there is provided a process and apparatus for lubricating a split-mold mold casting characterized in that each half-casting is lubricated separately while the mold is open. A jet of gas is directed just about parallel to each half-casting and from a position beyond one end of the latter. The expression "just about parallel to each half-casting" is used as opposed to sending the jet directly toward the casting, as done in conventional technology. The gas is heat-treated to form a powdery carbonaceous material.

In several advantageous embodiments of the invention, the apparatus comprises two fixed heads which are equipped to create the jet of gas and to heat-treat the jet to obtain a powdery carbonaceous material. Each head is associated with a half-mold and is arranged outside the path of the mold. The heads have injection axes which are just about parallel to their corresponding half-casting in the open position of the mold.

In an advantageous implementation, each head is provided with means to create a flame. The jet is injected through the flame in the manner described in the above French patent, for example.

A further embodiment of the invention comprises a machine for manufacturing glass bottles, of the type called an "I.S. machine". The machine includes at least one module having a split rough-forming mold, a finishing mold and a device for transferring the rough-forms of the first mold to the second mold. The rough-forming mold is equipped with a lubricating device of the type defined above.

The present invention as well as further objects and features thereof will be more fully understood from the following description of certain preferred embodiments, when read with reference to the accompanying drawings.

BRIEF DESCRIPTION OF THE DRAWINGS

FIG. 1 is a schematic top view of a lubricating device according to an illustrative embodiment of the invention.

FIG. 2 is a view similar to FIG. 1 but showing another phase of the molding cycle.

FIG. 3 is a fragmentary perspective view of a portion of the device illustrated in FIG. 1.

FIG. 4 is an enlarged vertical sectional view of the injection head of the device.

FIGS. 5 and 6 are schematic representations of apparatus in accordance with further illustrative embodiments of the invention.

DESCRIPTION OF CERTAIN PREFERRED EMBODIMENTS

FIGS. 1 to 3 diagrammatically show a split mold 1 equipped with a lubricating device 2. This mold is, for example, a rough-forming mold adapted for use with an "I.S. machine" for manufacturing glass bottles.

As is well known, an I.S. machine is a modular machine in which each module comprises a split rough-forming mold, a glass blowing or finishing mold and an arm for transferring the rough-forms from the first mold to the second mold. When in operation, the rough-forming mold, once closed, receives molten glass which is pressed or blown to constitute a rough form. The rough-forming mold is then opened, and the rough-form is transported by the transferring arm into the finishing mold. In the finishing mold the rough-form is blown to achieve its final form, then it is discharged. The rough-forming mold is lubricated periodically in order to minimize the risk of the glass sticking to the mold.

As can be seen in FIG. 1, the mold 1 is made up of two half-molds 3. Each of the half-molds 3 is of generally semi-cylindrical configuration and is carried by an arm 4. Both of there arms are articulated around a fixed vertical axis X—X. The half-molds 3 are movable between a closed position (FIG. 2) and an open position (FIGS. 1 and 3). Each half-mold forms a mold half-casting and, in the closed position of the mold, an approximately cylindrical annular casting which is slightly wider at the top and open at both its ends.

The lubricating device 2 includes two fixed heads 5 for injecting a gas that forms a powdery carbonaceous material. Each of the heads 5 is carried by a fixed arm 6. Each head is associated with a half-mold 3 and is arranged slightly above the upper surface of its half-mold such that it does not interfere with the opening and closing movements of the mold.

Referring to FIG. 4, each of the heads 5 is cylindrical in shape and has a central conduit 7 with a vertical axis Y—Y linked to a conduit 8 that supplies the gas. Each head 5 also is provided with a series of conduits 9 arranged around the axis Y—Y and linked to a conduit 10 that supplies an oxygen-inflammable mixture. As described in the above-mentioned French Pat. No. 2,460,312, the gas supplied to the central conduit 7 may be acetylene, and the gas supplied to the conduits 9 may be a mixture of methane-oxygen or ethane-oxygen. The axis Y—Y just about coincides with the axis of the corresponding half-mold 3 when the mold is in the open position (FIGS. 1 and 3), although the axis Y—Y may have a slight inclination toward the surface of the half-casting.

While the machine is in operation, a flame 11 is constantly kept alight at the output of the conduits 9 in the two heads 5. The conduits 9 are fed from a constant supply of oxygen-inflammable mixture in a stoechiometric proportion. When the mold is open to enable the ejection of the shaped rough-form, each head 5 is plumb with the upper opening of the corresponding half-casting. When lubrication of the casting is desired, acetylene is introduced via the conduit 8 through the central conduits 7 in the heads 5. The acetylene crosses the crown of the flame 11 and undergoes heat-cracking, and it then burns incompletely to form a main combustion flame 12. The incomplete combustion causes carbon black particles to form and these particles settle in a thin layer on the facing surface of the half-casting.

Surprisingly, one can thus obtain, during the mold's normal opening time, a good deposit of carbon black which reliably avoids any sticking of the rough-form to the mold. Proper conventional means can easily insure the automatic operation of this lubricating process.

As a variant, as illustrated in FIG. 5, the invention may be applied to a machine with twin half-molds 3A and 3B. In this latter embodiment each arm 6 carries two heads 6, and the axis of each of the heads coincides with the axis of one of the two half-castings when the mold is open.

Another variant is illustrated in FIG. 6. A half mold 3C has a noncircular cross-sectional shape with small dimensions as in the preceding examples, but a comparatively big horizontal dimension, e.g. in the shape of an elongate semi-rectangle. The half-mold 3C is lubricated by a plurality of heads 5 on a single arm 6. The heads 5 are judiciously arranged in relation to the corresponding half-mold, when the mold is open, to insure a sufficiently uniform deposit of carbon black on the mold casting.

The terms and expressions which have been employed are terms of description and not of limitation, and there is no intention in the use of such terms and expressions of excluding any equivalents of the features shown and described, or portions thereof, but it is recognized that various modifications are possible within the scope of the invention.

What is claimed is:

1. A process for lubricating a split-mold mold casting, the split mold comprising two half-molds each defining a half-casting and having an end, the process comprising, in combination:
   moving said half-molds apart to an open position;
   forming a jet of gas at a stationary location beyond said end of each respective half-mold when said half-molds are in their open positions, and directing said jet of gas toward the respective open half-mold along an axis just about parallel to the corresponding half-casting; and
   heating the jets of gas to form a powdery carbonaceous lubricating material.

2. A process as defined by claim 1, in which each half-mold has an opening in said end, the jets of gas being directed through the openings in the respective half-molds.

3. A process as defined in claim 1, in which each half-mold has a longitudinal axis, the process comprising directing said jets of gas along axes just about coincident with the longitudinal axes of the respective half-molds.

4. A process as defined in claim 1, comprising forming a permanent flame at each said stationary location, and intermitently passing each said jet through the respective flame.

5. Apparatus for lubricating a split-mold mold casting in which the mold includes two half-molds each having an end and defining a half-casting, the apparatus comprising, in combination:
   means for moving the half-molds apart to an open position;
   means including a pair of head members respectively mounted at fixed locations adjacent each open half-mold and beyond said end thereof for directing a jet of gas toward the open half-mold along an axis just about parallel to the half-casting; and
   means for heating the jets of gas to form a powdery carbonaceous lubricating material.

6. Apparatus as defined in claim 5 in which each half-mold has a longitudinal axis and said gas directing means are arranged for directing said jets of gas in directions just about coincident with the longitudinal axis of the respective half-molds.

7. Apparatus as defined in claim 5, comprising
   flame means for igniting each jet of gas to form a powdery carbonaceous lubricating material, said jet passing through said flame means.

8. Apparatus as defined in claim 7, in which the flame means for each of the head members surrounds the corresponding jet of gas.

9. Apparatus as defined in claim 7, in which the gas directing means for each of the head members is arranged to intermittently direct its jet of gas toward the corresponding half-mold, and in which the associated flame means is arranged to produce a continuous flame to ignite the intermittent jet.

10. In glass bottle producing apparatus of the type having at least one split rough-forming mold including two half-molds each having a longitudinal axis and an end, a finishing mold, and means for transferring rough forms from the rough-forming mold to the finishing mold, a lubricating device for the rough-forming mold which comprises, in combination:
    means for moving the half-molds of the rough forming mold apart to an open position;
    means including a pair of head members respectively mounted at fixed locations adjacent each open half-mold of the rough forming mold and beyond said end thereof and in a position for directing a jet of gas toward said open half-mold along an axis just about coincident with the longitudinal axis of the half-mold; and
    means for igniting the jets of gas to form a powdery carbonaceous carbonated lubricating material.

11. A process for lubricating a split-mold casting in which the split mold comprises two half-molds movable between open and closed positions, each of the half-molds having a half-mold axis and the half-molds defining a central axis when in their closed positions, the process comprising, in combination:
    moving said half-molds apart to their open positions;
    forming a first jet of combustible gas at a first fixed location with respect to said central axis, said first fixed location being spaced from one of the open half-molds and in substantial alignment with the half-mold axis of said one half-mold when in its open position;
    forming a second jet of combustible gas at a second fixed location with respect to said central axis, said second fixed location being spaced from the other open half-mold and in substantial alignment with the half-mold axis of said other half-mold when in its open position;

igniting the jets of gas to form a carbonaceous lubricating material;

directing the carbonaceous lubricating material in separate streams from the respective fixed locations to the corresponding half-molds to lubricate the same; and thereafter moving said half-molds toward each other to their closed positions.

12. A process as defined in claim 11, in which the first and second fixed locations are in sufficient spaced-apart relationship with each other to prevent interaction between the first and second jets of gas.

13. A process for lubricating a split-mold casting in which the split mold comprises two half-molds movable between open and closed positions, each of the movable half-molds having a half-mold axis the half-molds and defining a central axis when in their closed positions, the process comprising, in combination:

moving said half-molds apart to their open positions;

forming a first jet of combustible gas and a first flame at a first fixed location with respect to said central axis, said first fixed location being spaced from one of the open half-molds and in substantial alignment with the half-mold axis of said one half-mold when in its open position;

forming a second jet of combustible gas and a second flame at a second fixed location with respect to said central axis, said second fixed location being spaced from the other open half-mold and in substantial alignment with the half-mold axis of said other half-mold when in its open position;

said first and second flames separately heating the jets of gas to form separate parallel streams of carbonaceous lubricating material;

directing the separate streams from the respective fixed locations to the corresponding half-molds to lubricate the same; and thereafter moving said half-molds toward each other to their closed positions.

* * * * *